United States Patent
Wertz et al.

(10) Patent No.: US 11,255,313 B2
(45) Date of Patent: Feb. 22, 2022

(54) SYSTEM AND METHOD FOR REDUCING THE TRANSPORT WIDTH OF A GEARBOX FOR A WIND TURBINE

(71) Applicant: General Electric Company, Schenectady, NY (US)

(72) Inventors: Aaron Joseph Wertz, Cincinnati, OH (US); Boobalan Ayyasamy, Simpsonville, SC (US); Hayden Patrick Mcgarity-Bashiri, Cincinnati, OH (US); Martxel Ruiz Luisa, Barcelona (ES); Raed Zuhair Hasan, Greenville, SC (US); Fulton Jose Lopez, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/830,977

(22) Filed: Mar. 26, 2020

(65) Prior Publication Data
US 2020/0309098 A1 Oct. 1, 2020

(30) Foreign Application Priority Data
Mar. 27, 2019 (EP) .................................... 19382217

(51) Int. Cl.
*F03D 15/00* (2016.01)
*F03D 13/10* (2016.01)
*F03D 80/70* (2016.01)

(52) U.S. Cl.
CPC ............. *F03D 15/00* (2016.05); *F03D 13/10* (2016.05); *F03D 80/70* (2016.05);
(Continued)

(58) Field of Classification Search
CPC .......... F03D 15/00; F03D 13/10; F03D 80/70; F05B 2230/60; F05B 2240/14;
(Continued)

(56) References Cited

U.S. PATENT DOCUMENTS

| 8,632,437 B2 | 1/2014 | Dinter et al. |
| 2011/0187122 A1* | 8/2011 | Martinez ................. F03D 15/00 290/55 |

(Continued)

FOREIGN PATENT DOCUMENTS

| DE | 2421567 A1 | 11/1974 |
| EP | 2172647 A1 | 4/2010 |

OTHER PUBLICATIONS

European Search Report Corresponding to EP19382217.8 dated Sep. 6, 2019.

*Primary Examiner* — Sean Gugger
(74) *Attorney, Agent, or Firm* — Dority & Manning, P.A.

(57) ABSTRACT

The present disclosure is directed to a gearbox assembly for a wind turbine. The gearbox assembly has a maximal installed width and a maximal transport width. The maximal installed width is greater than the maximal transport width. The gearbox assembly includes at least one torque arm coupled to opposing sides of the gearbox housing. Each of the torque arms includes a proximal end and a distal end. The proximal ends are removably coupled to the exterior surface of the gearbox such that the distance between the distal ends define the maximal installed width. The torque arms are coupled to at least one support element and to a bedplate of the wind turbine.

20 Claims, 9 Drawing Sheets

(52) U.S. Cl.
CPC ....... *F05B 2230/60* (2013.01); *F05B 2240/14* (2013.01); *F05B 2240/50* (2013.01); *F05B 2240/60* (2013.01); *F05B 2260/40311* (2013.01)

(58) Field of Classification Search
CPC .............. F05B 2240/50; F05B 2240/60; F05B 2260/40311
See application file for complete search history.

(56) References Cited

U.S. PATENT DOCUMENTS

| | | | |
|---|---|---|---|
| 2015/0007692 A1 | 1/2015 | Trede | |
| 2015/0007693 A1* | 1/2015 | Trede | F03D 80/70 74/606 R |
| 2017/0260909 A1* | 9/2017 | Jiang | F02C 7/32 |

\* cited by examiner

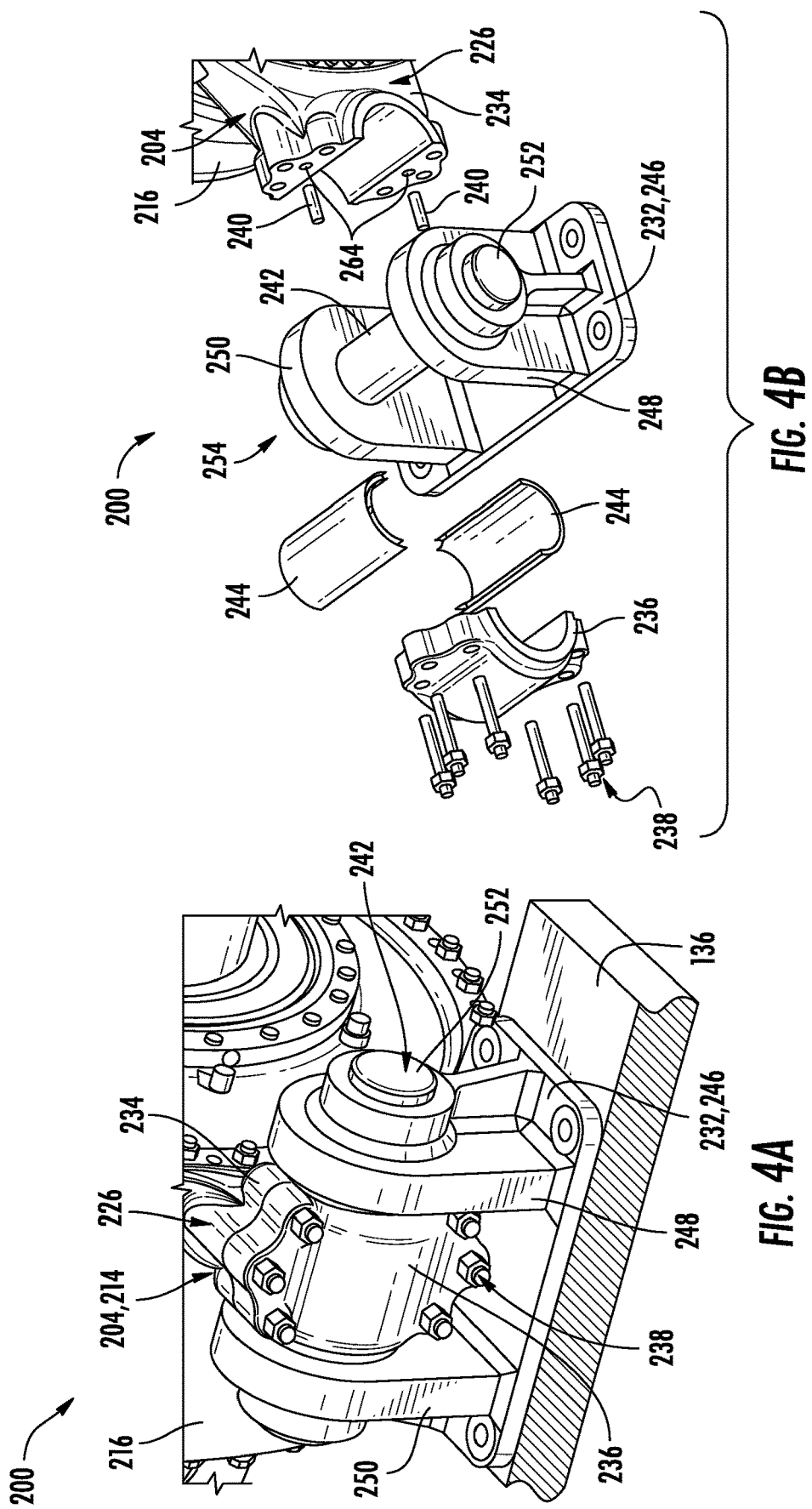

SYSTEM AND METHOD FOR REDUCING THE TRANSPORT WIDTH OF A GEARBOX FOR A WIND TURBINE

FIELD

The present disclosure relates in general to wind turbines, and more particularly to systems and methods for reducing the transport width of a gearbox for use in a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the turbine blades, which spin a low speed shaft. The low speed shaft is coupled to an input shaft of a gearbox, which has a higher speed output shaft connected to a generator. Thus, the geared drivetrain aims to increase the velocity of the mechanical motion. The gearbox and the generator are typically separately mounted to the bedplate. More specifically, the output shaft of the gearbox and the input shaft of the generator are separately supported by gearbox bearings and generator bearings, respectively. Thus, the gearbox and corresponding input shaft are typically mounted to the bedplate via one or more torque arms.

In some instances, mounting the gearbox via torque arms presents certain design challenges. Specifically, the torque arms increase the overall width of the gearbox. Depending on the design of the gearbox and the torque arms, the overall width of the assembled gearbox may exceed standard shipping parameters, yet it may remain desirable to transport the gearbox in an assembled configuration. Additionally, the presence of the torque arms may limit the available manufacturing techniques for forming the assembly. Specifically, the presence of the torque arms may mean that certain pieces of manufacturing equipment will lack sufficient clearance to form a ring gear on the inside face of the gearbox.

In view of the aforementioned, the art is continuously seeking new and improved systems and methods for reducing the transport width of a gearbox while maintaining the maximal installed width of the gearbox. Thus, a system and method that includes a gearbox having a transport width which is less than an installed width would be advantageous.

BRIEF DESCRIPTION

Aspects and advantages of the invention will be set forth in part in the following description, or may be obvious from the description, or may be learned through practice of the invention.

In one aspect, the present disclosure is directed to a gearbox assembly for a wind turbine. The gearbox assembly includes a gearbox having an installed width and a transport width. The installed width is greater than the transport width. The gearbox includes a gearbox housing including an exterior surface, which defines the transport width, and an inner cavity. The gearbox also includes a gearing arrangement arranged within the inner cavity. The gearbox assembly includes a first torque arm coupled to a first side of the gearbox housing and a second torque arm coupled to an opposing, second side of the gearbox housing. Each of the first and second torque arms includes a proximal end and a distal end. The proximal ends are coupled to the exterior surface of the gearbox housing such that a distance between the distal ends of the first and second torque arms define the installed width. The gearbox assembly also includes at least one support element coupling the plurality of torque arms to a bedplate of the wind turbine.

In one embodiment, the installed width is a maximal installed width and the transport width is a maximal transport width. Additionally, In at least one embodiment, the first and second torque arms each may include a base portion including the proximal ends thereof and at least one detachable endcap positioned radially outward from the base portion.

In another embodiment, the at least one support element may include a pedestal bracket secured to the bedplate and may support a mounting pin. The pedestal bracket may include opposing bracket arms defining a gap therebetween that receives the at least one endcap. The mounting pin may be secured between the at least one endcap and the base portion of one of the first and second torque arms. In an additional embodiment, the gearbox assembly may also include a segmented bushing arranged between the opposing bracket arms that receive the mounting pin.

In yet another embodiment, the first and second torque arms each may include a pair of detachable end caps positioned radially outward therefrom. In at least one embodiment, the pedestal bracket may be disposed between the pair of detachable end caps. The mounting pin may be secured through the base portion and may be secured between the pair of detachable end caps and the base portion of one of the first and second torque arms.

In further embodiments, the proximal end of at least one torque arm may be removably coupled to the exterior surface of the gearbox housing via at least one of a dovetail joint, a mortise-and-tenon joint, a bolted joint, or a bonded joint. In certain embodiments, the mortise-and-tenon joint may include an additional securing pin positioned therethrough. In yet another embodiment, the first and second torque arms or the exterior surface of the gearbox housing may include a recess and the other of the first and second torque arms or the exterior surface of the gearbox housing may include a flange received within the recess the flange forming the bolted joint or the bonded joint. In certain embodiments, the maximal transport width of the gearbox assembly may be less than or equal to 2.34 meters.

In another aspect, the present disclosure is directed to a method for assembling a gearbox assembly for a wind turbine. The method includes coupling a plurality of support elements to a bedplate of a wind turbine. The method also includes positioning a gearbox having a gearbox housing defining a maximal transport width between the plurality of support elements. A further step of the method includes coupling at least a portion of a plurality of torque arms to opposing sides of an exterior surface of the gearbox housing so as to transition the gearbox to a maximal width. The method also includes securing each of the plurality of torque arms to one of the plurality of support elements.

In one embodiment, coupling at least a portion of the plurality of torque arms to the gearbox housing may also include coupling at least one detachable endcap radially outward from a base portion. In another embodiment, securing each of the plurality of torque arms to one of the plurality of support elements may also include securing each of the plurality of torque arms to a pedestal bracket secured to the bedplate.

In a particular embodiment, coupling at least a portion of the plurality of torque arms to opposing sides of an exterior surface of the gearbox may further include coupling a proximal end of at least one of the plurality of torque arms to the exterior surface of the gearbox housing via a dovetail joint, a mortise-and-tenon joint, a bolted joint, and/or a bonded joint. It should be understood that the method may further include any of the additional steps and/or features as described herein.

In another aspect, the present disclosure is directed to a wind turbine. The wind turbine includes a tower, a nacelle mounted atop the tower, and a rotor. The wind turbine includes a gearbox positioned within the nacelle. The gearbox assembly has a maximal installed width which is greater than a maximal transport width. The gearbox includes a gearbox housing having an inner surface and an outer surface and a gearing arrangement. The inner surface defines an inner cavity and a portion of the gearing arrangement is contained within the inner cavity. The wind turbine also includes a plurality of torque arms coupled to the gearbox housing. Each torque arm of the plurality of torque arms includes a proximal end and a distal end opposite thereof. A distance between respective distal ends of two torque arms of the plurality of torque arms define the maximal installed width. The wind turbine also has at least one support element coupled to the plurality of torque arms and a bedplate support frame. A rotor shaft rotatably couples the rotor to the gearbox.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4A illustrates a perspective view of one embodiment of a portion of a gearbox assembly particularly illustrating a torque arm and at least one support element according to aspects of the present disclosure;

FIG. 4B illustrates an exploded perspective view of the embodiment depicted in FIG. 4A;

DETAILED DESCRIPTION

Figure 1:
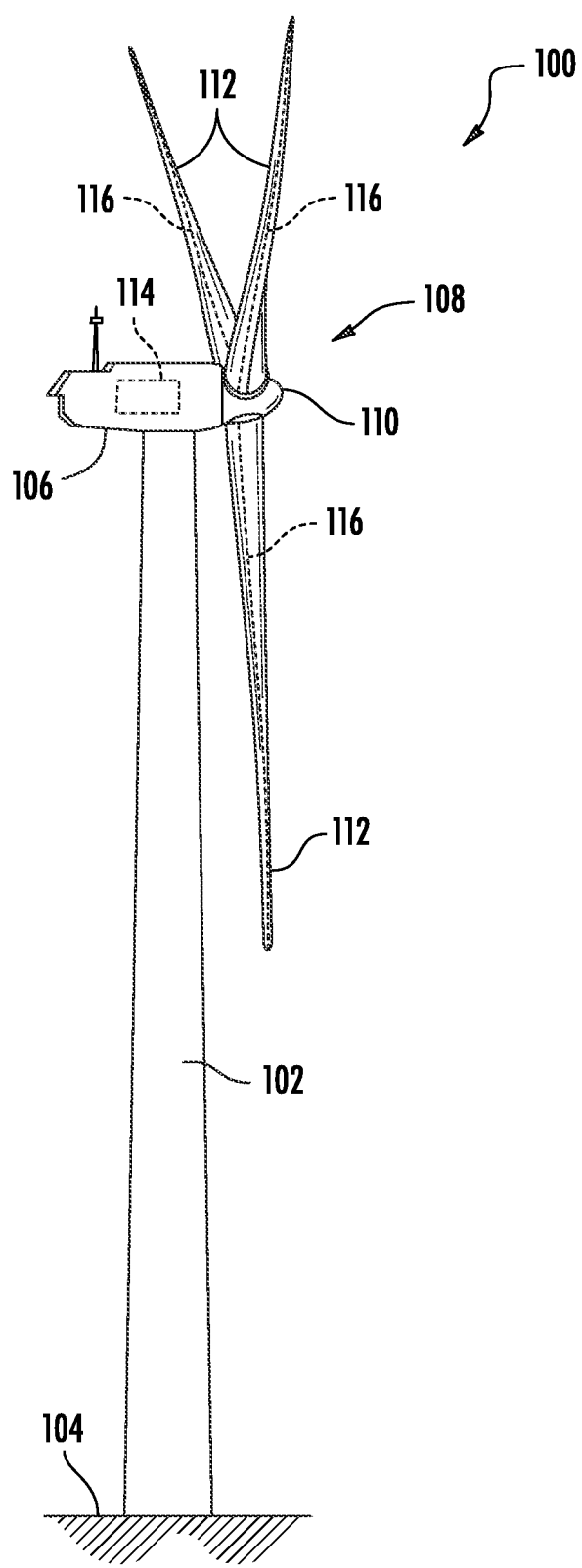
FIG. 1 illustrates a perspective view of one embodiment of a wind turbine according to aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gearbox assembly for a wind turbine that is configured to have a reduced transport width. The gearbox assembly includes a gearbox having a maximal installed width that is greater than a maximal transport width of a gearbox housing. This is achieved through the utilization of support structures having the unique features of the present disclosure. Specifically, the gearbox may include a first torque arm and a second torque arm. The torque arms may be coupled to the exterior surface of the gearbox housing and the distance between the radially distal ends of the torque arms may define the maximal installed width. In at least one embodiment, the torque arms may include base portions coupled to the gearbox housing and detachable endcaps positioned radially outward from the base portions. In another embodiment, the torque arms may be removably coupled to the exterior surface of the gearbox housing via at least one of a dovetail joint, a mortise-and-tenon joint, a bolted joint, and/or a bonded joint.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a wind turbine controller 114 centralized within the nacelle 106. However, in other embodiments, the controller 114 may be located within any other component of the wind turbine 100 or at a location outside the wind turbine. Further, the controller 114 may be communicatively coupled to any number of the components of the wind turbine 100 in order to control the components. As such, the controller 114 may include a computer or other suitable processing unit. Thus, in several embodiments, the controller 114 may include suitable computer-readable instructions that, when implemented, configure the controller 114 to perform various different functions, such as receiving, transmitting and/or executing wind turbine control signals.

Figure 2:
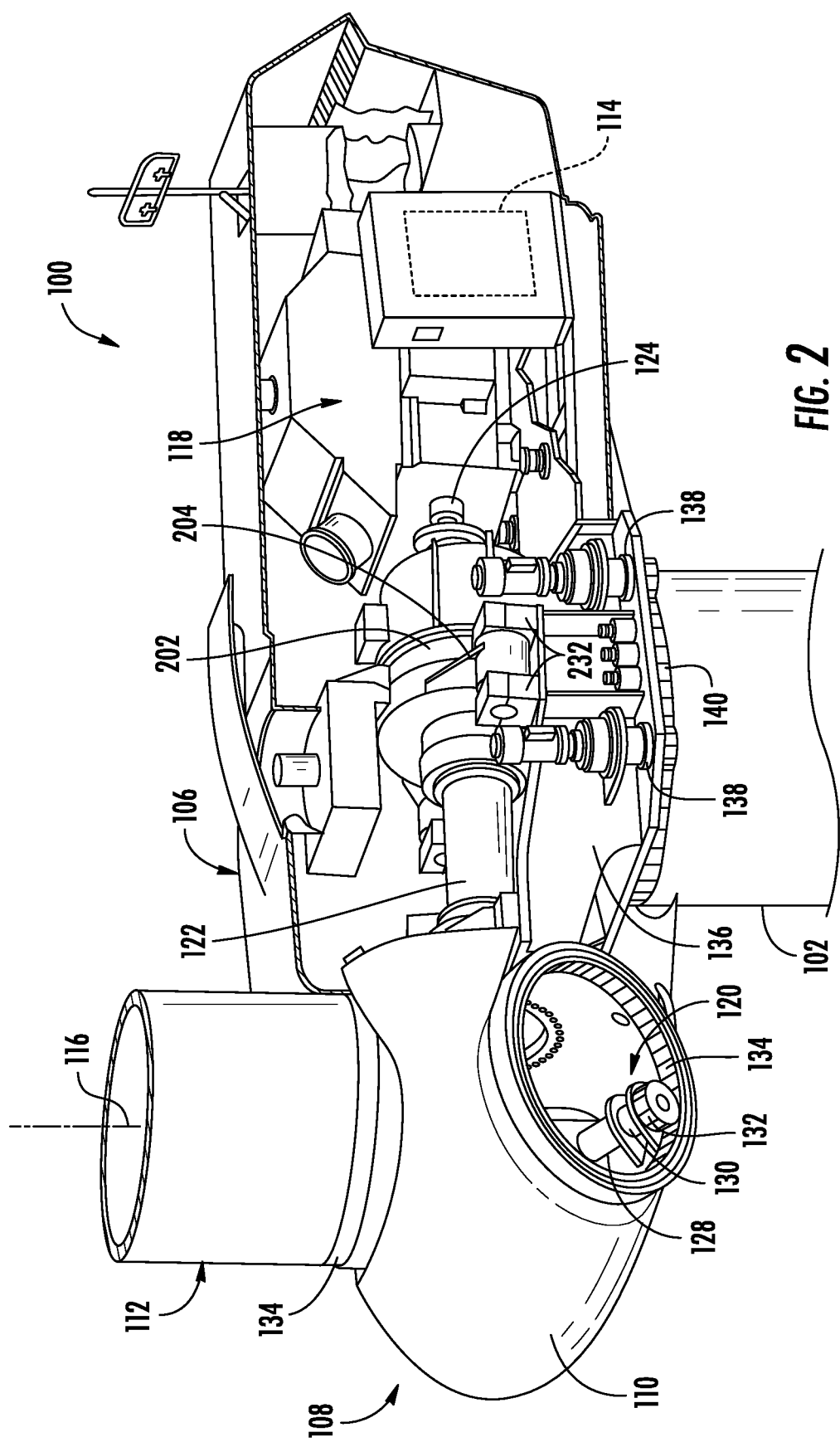
FIG. 2 illustrates a perspective view of one embodiment of a simplified, internal view of one embodiment of a nacelle of a wind turbine according to aspects of the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may, in turn, be rotatably coupled to a generator shaft 124 of the generator 118 through a gearbox 202 connected to a bedplate support frame 136 by one or more torque arms 204. As is generally understood, the rotor shaft 122 may provide a low speed, high torque input to the gearbox 202 in response to rotation of the rotor blades 112 and the hub 110. The gearbox 202 may then be configured to convert the low speed, high torque input to a high speed, low torque output to drive the generator shaft 124 and, thus, the generator 118.

Each rotor blade 112 may also include a pitch adjustment mechanism 120 configured to rotate each rotor blade 112 about its pitch axis 116. Further, each pitch adjustment mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade 112 about the pitch axis 116. Similarly, the wind turbine 100 may include one or more yaw drive mechanisms 138 communicatively coupled to the controller 114, with each yaw drive mechanism(s) 138 being configured to change the angle of the nacelle 106 relative to the wind (e.g., by engaging a yaw bearing 140 of the wind turbine 100).

Figure 3B:
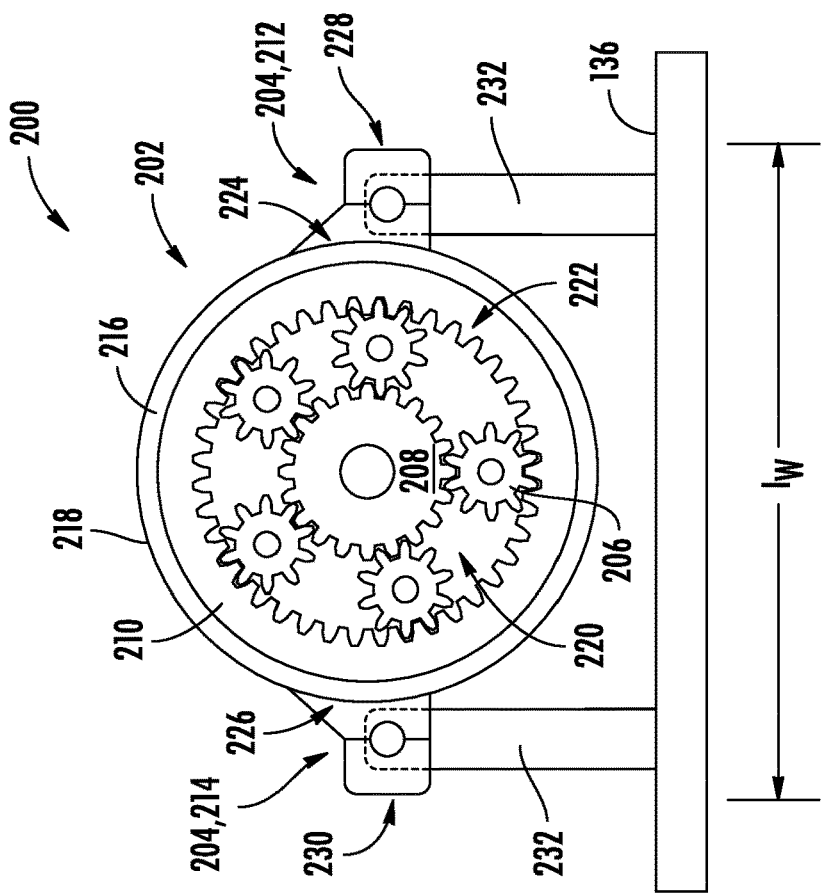
FIG. 3B illustrates a front view of one embodiment of a gearbox having a maximal installed width according to aspects of the present disclosure.
Figure 3A:
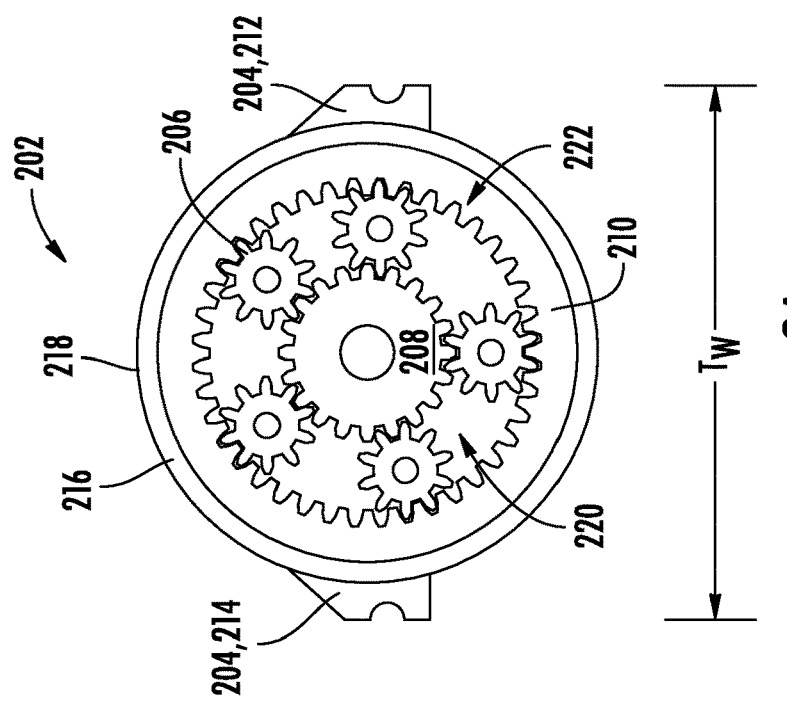
FIG. 3A illustrates a front view of one embodiment of a gearbox having a maximal transport width according to aspects of the present disclosure.

Referring now to FIGS. 3A and 3B, front views of a gearbox assembly 200 in accordance with an embodiment of the present disclosure are illustrated. As shown, the gearbox assembly 200 includes the gearbox 202 described herein and the gearbox 202 has a gearbox housing 216. As depicted in FIG. 3A, the gearbox 202 may include any suitable gear assembly that uses one or more gears and/or gear trains to provide speed and/or torque conversions from the rotor shaft 122 to the generator 118. For example, as shown, the gearbox 202 may include a gearing arrangement 222 arranged within an inner cavity 220 of the gearbox housing 216. The gearing arrangement 222 may have one or more outer or planet gears 206 revolving about a central or sun gear 208. In addition, the planet gears 206 are typically mounted on a movable arm or carrier (not shown) which itself may rotate relative to the sun gear 208. The gearbox 202 may also include at least one outer ring gear 210 configured to mesh the planet gears 206. Thus, a typical ring gear 210, such as that shown in FIGS. 3A and 3B, generally includes a set of gear teeth on an inner circumferential surface thereof that are configured to mesh with corresponding teeth of the planet gears 206.

As shown in FIG. 3B, the gearbox assembly 200 may be supported atop the bedplate support frame 136, which may, in turn, be mounted on the nacelle 106. The gearbox assembly 200 may further include at least one torque arm 204 and at least one support element 232. Thus, as shown, the gearbox 202 may be secured to the bedplate support frame 136 via the torque arm(s) 204, which may, in turn, be coupled to the support element(s) 232. More specifically, the torque arm(s) 204 may include a first torque arm 212 and a second torque arm 214 coupled to opposing sides of the gearbox 202. It should be appreciated that, in certain embodiments, the torque arm(s) 204 may be integral with the bedplate support frame 136.

Referring still to FIGS. 3A and 3B, the gearbox housing 216 may have an exterior surface 218 and an inner cavity 220. The exterior surface 218 may, as particularly depicted in FIG. 3A, define the transport width (Tw) of the gearbox 202, which may be the maximal transport width. For example, in a cross-sectional view of the gearbox housing 216, such as FIG. 3A, the exterior surface 218 may be the perimeter of the depicted shape and may define the transport width (Tw). When the gearbox 202 is installed in the wind turbine 100, the gearbox 202 may have an installed width (Iw) which may be the maximal installed width and which is greater than the maximal transport width (Tw). Furthermore, the gearbox 202 may be in a transport configuration when the gearbox housing has the maximal transport width (Tw) and may be in an installed configuration when the gearbox has the maximal installed width (Iw). In at least one embodiment, the maximal transport width may be less than or equal to 2.34 meters (e.g., greater than 1.9 meters and less than or equal to 2.3 meters).

It should be appreciated that in an embodiment wherein the maximal transport width (Tw) is less than or equal to 2.34 meters, the transportation of the gearbox assembly 200 may be facilitated. For example, the maximal transport width (Tw) of the gearbox assembly 200 may be less than the standard width of a standardized shipping container (e.g., an ISO or intermodal shipping container), which may facilitate standardized shipping of the gearboxes 200 or may allow multiple gearboxes 200 to be shipped in a single shipping container. Alternatively, in at least one embodiment, the maximal transport width may be less than or equal to 2.59 meters (e.g., greater than or equal to 2.5 meters and less than or equal to 2.58 meters). Limiting the maximal transport width to less than or equal to 2.59 meters may facilitate trucking the gearbox on United States roads without requiring special permitting. Additionally, the maximal transport width (Tw) being less than the maximal installed width (Iw) may ensure sufficient clearance exist between the gearbox housing 216 and a piece of machining equipment, so as to facilitate the formation of the ring gear 210 within the inner cavity 220 of the gearbox housing 216.

Still referring to FIGS. 3A and 3B, the first torque arm 212 and the second torque arm 214 may include respective proximal ends 224, 226 and respective distal ends 228, 230. A distance between the distal ends 228, 230 defines the maximal installed width (Iw) of the gearbox 202. The proximal ends 224, 226 may be coupled to, or integrated with, the exterior surface 218 of the gearbox housing 216. As used herein, the term "couple" may include embodiments wherein a first component is attached to a second component (e.g., by welding, gluing, brazing, adhering, or otherwise mechanically joining) or may include embodiments wherein the first component is formed integrally with the second component by any known manufacturing method (e.g., additive manufacturing, casting, machining, molding, composite layup, extruding, or any combination thereof).

As will be discussed in more detail below, in at least one embodiment, the proximal ends 224, 226 may be removably coupled to the gearbox housing 216 or may be permanently coupled to the gearbox housing 216 following delivery to the wind turbine 100. In such an embodiment, the maximal transport width (Tw) may be established by a maximal width dimension of the gearbox housing 216. Alternatively, in at least one embodiment, the proximal ends 224, 226 may be permanently coupled to the gearbox housing 216 prior to delivery to the wind turbine 100. In such an embodiment, the proximal ends 224, 226 may be integrated into the exterior surface 218 so that a maximal distance between the respective proximal ends 224, 226 establishes the maximal transport width (Tw).

Referring now to FIGS. 4A and 4B, perspective views of one embodiment of a portion of the gearbox assembly 200 in accordance with aspects of the present disclosure are illustrated. As depicted in FIG. 4A, at least one of the torque arms 204 may include a base portion 234, which includes the respective proximal end. For example, as shown, the second torque arm 214 may include a base portion 234, which includes the proximal end 226. At least one of the torque arms 204 may include at least one detachable endcap 236 positioned radially outward from the base portion 234. The detachable endcap(s) 236 may be secured to the base portion 234 via one or more fasteners 238. The securing of the detachable endcap 236 to the base portion 234 may, in at least one embodiment, be facilitated by a plurality of alignment pins 240 configured to be received by corresponding recesses 264 in the detachable endcap 236 and the base portion 234. It should be appreciated that, while the second torque arm 214 is depicted in FIGS. 4A and 4B, the discussion above applies equally to the first torque arm 212, as well as to any additional torque arms. It should further be appreciated that the securing of the detachable endcap caps 236 to the respective base portions 234 may serve to define the maximal installed width (Iw) of the gearbox 202 and may be accomplished during the installation of the gearbox assembly 200 in the wind turbine 100.

Referring still to FIGS. 4A and 4B, in at least one embodiment, in accordance with aspects of the present disclosure, the support element 232 may be a pedestal bracket 246 secured to the bedplate 136 of the wind turbine 100. As shown, the pedestal bracket 246 may support a mounting pin 242. In certain embodiments, as shown particularly in FIG. 4B, a portion of the mounting pin 242 may be encased within a segmented bushing 244. It should be appreciated that, in certain embodiments, the segmented bushing 244 may be an elastomeric member which serves to limit the effects of vibration on the functionality of the wind turbine 100.

In at least one embodiment, such as is depicted by FIGS. 4A and 4B, the pedestal bracket 246 may have opposing bracket arms 248, 250. The pedestal bracket 246 may, thus, generally have a U-shaped configuration. The opposing bracket arms 248, 250 may define a gap therebetween that receives the detachable endcap 236. The mounting pin 242 may have a mounting pin first end 252 and a mounting pin second end 254. The mounting pin first end 252 may be supported by the bracket arm 248, while the mounting pin second end 254 may be supported by the opposing bracket arm 250. A portion of the mounting pin 242 between the opposing bracket arms 248, 250 may be encased within the segmented bushing 244, so that, in turn, the segmented bushing 244 and the mounting pin 242 may be secured between the detachable endcap 236 and the base portion 234. It should be appreciated that the pedestal bracket 246 and the mounting pin 242 may be formed as a single, integrated component without seams or joints.

Figure 5:
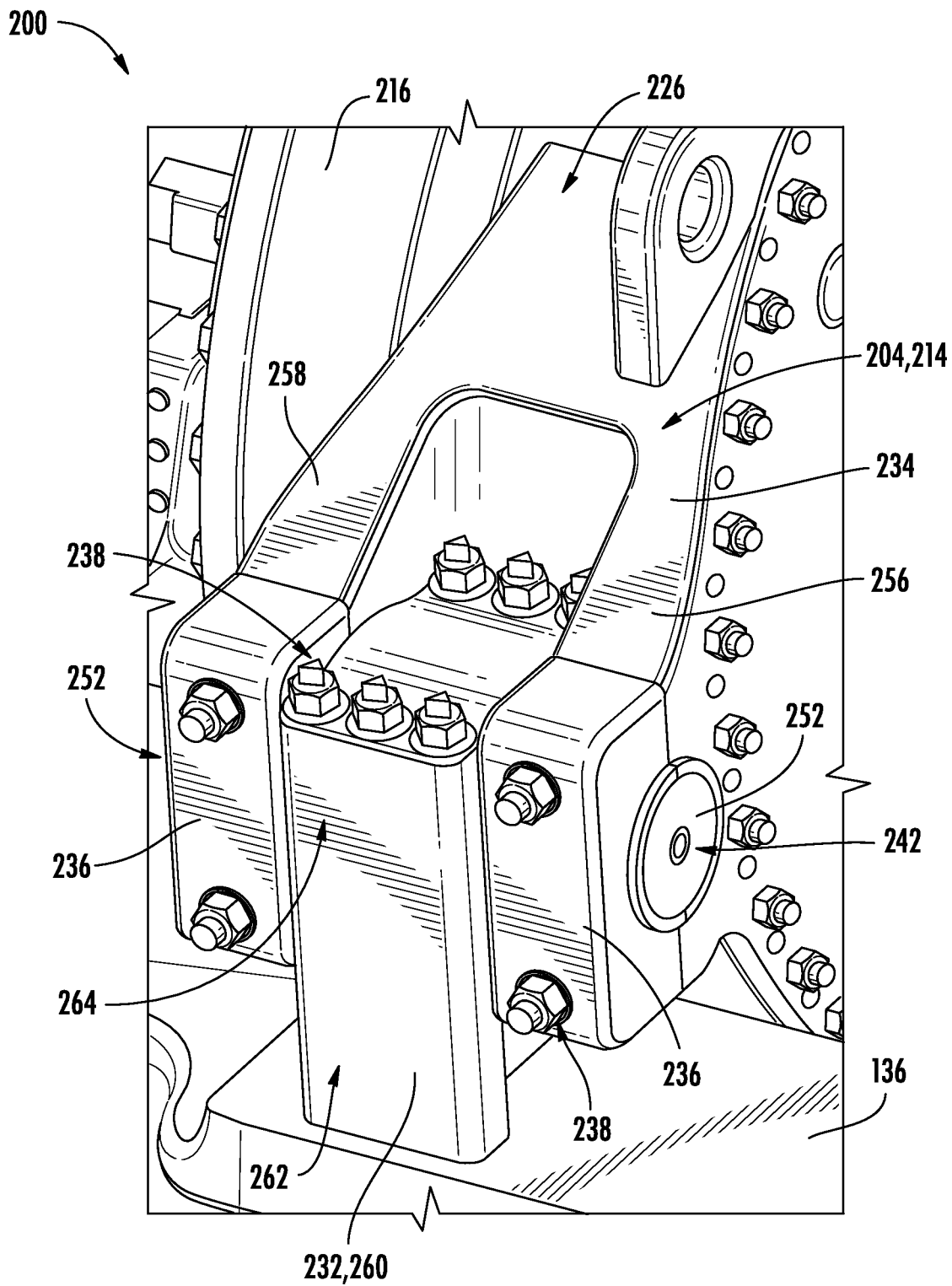
FIG. 5 illustrates a perspective view of one embodiment of a portion of a gearbox assembly particularly illustrating a torque arm and at least one support element according to aspects of the present disclosure.

Referring now to FIG. 5, an alternative embodiment of the one of the torque arms, i.e. the second torque arm 214, and at least one support element 232 in accordance with aspects of the present disclosure is depicted. Though described with reference to the second torque arm 214, the embodiment depicted in FIG. 5 is equally applicable to the first torque arm 212. As depicted in FIG. 5, and as discussed above, the torque arms 212, 214 may include a base portion 234, which includes the respective proximal end 224, 226. The base portion 234 may include a first base arm 256 and an opposing second base arm 258. The torque arms 204 may, thus, generally have a U-shaped configuration. The torque arms 212, 214 may each include a pair of detachable endcaps 236 positioned radially outward from the base portion 234. The pair of detachable endcaps 236 may be secured to the respective base arms 256, 258 via one or more fasteners 238. It should be appreciated that the securing of the detachable endcap caps 236 to the respective base portions 234 may serve to define the maximal installed width (Iw) of the gearbox 202 and may be accomplished during the installation of the gearbox assembly 200 in the wind turbine 100.

In an embodiment, such as depicted in FIG. 5, the support element(s) 232 may be a columnar pedestal bracket 260. The columnar pedestal bracket 260 may be disposed between the pair of detachable end caps 236 and coupled to the bedplate 136 of the wind turbine 100. In at least one embodiment, the columnar pedestal bracket 260 may be a unitary component. Alternatively, the columnar pedestal bracket may have a pedestal base 262 coupled to the bedplate 136. The columnar pedestal bracket 260 may also have a pedestal cap 264 coupled to the pedestal base 262 by a plurality of fasteners 238.

As further illustrated by FIG. 5, the mounting pin 242 may be secured through the columnar pedestal bracket 260. The mounting pin 242 may also be secured between the pair of detachable end caps 236 and the base portion 234 of the torque arms 212, 214. Specifically, the mounting pin first end 252 may be secured between one of the pair of detachable endcaps and the first base arm 256, while the mounting pin second end 254 may be secured between one of the pair of detachable end caps 236 and the second base arm 258.

With the mounting pin ends 252, 254 secured between the detachable end caps 236 and the base portion 234, the portion of the mounting pin 242 between the opposing base arms 256, 258 may be encapsulated by the segmented bushing 244. The segmented bushing 244 and the corresponding portion of the mounting pin 242 may be secured between the pedestal base 262 and the pedestal cap 264. In an alternative embodiment, the mounting pin 242 and the support element 232 may be integrally formed so as to develop a generally T-shaped component. It should be appreciated that integrally forming a generally T-shaped component may include manufacturing a unitary component, without seams or joints, or alternatively, permanently coupling the mounting pin 242 to the support element 232 during the manufacturing of the support element 232.

Referring now to FIGS. 6A-8, several different embodiments in accordance with aspects of the present disclosure are presented. As depicted in FIGS. 6A-8, the first and second torque arms 212, 214 may be removably coupled to the exterior surface 218 of the gearbox housing 216. More specifically, as shown, the torque arms 204 may be coupled to the gearbox housing 216 via at least one of a dovetail joint, a mortise-and-tenon joint, a bolted joint and/or a bonded joint. In such an embodiment, the maximal width of the gearbox housing 216 defines the maximal transport width (Tw) of the gearbox 202. The maximal installed width (Iw) is defined by the coupling of the torque arms 204 to the gearbox housing 216 following delivery to the wind turbine 100 and during the installation of the gearbox 202 in the wind turbine 100. In other words, the gearbox 202 may be manufactured and delivered to the worksite without the torque arms 204 being installed. It should be appreciated that manufacturing the gearbox 202 without the torque arms 204 will facilitate the shipment of the gearbox 202 via standardized means and will eliminate certain manufacturing limitations related to the effect of the torque arms 204 on machining clearances.

It should be appreciated that in certain embodiments, the torque arms 204 being removably coupled to the gearbox housing 216 may be combined with other aspects of the present disclosure discussed above with regards to FIGS. 4A-5. For example, a torque arm 204 may be configured so that the base portion 234 is removably coupled to the exterior surface 218 of the gearbox housing 216. The torque arm 204 may also, as discussed above in reference to FIGS. 4A and 4B, include at least one detachable endcap 236 positioned radially outward from the base portion 234. A portion of the mounting pin 242 may be secured between the detachable endcap 236 and the base portion 234.

In yet another embodiment, the torque arm 204 and the support element 232 may be integrally formed so as to establish a unitary component. The unitary component may then be coupled to the gearbox housing 216 and to the bedplate 136 of the wind turbine 100. In such a configuration, the unitary component may perform the functions of the torque arm 204 and the support element 232. In one embodiment, the unitary component may likewise be formed integrally with the bedplate 136 of the wind turbine 100.

Figure 6A:
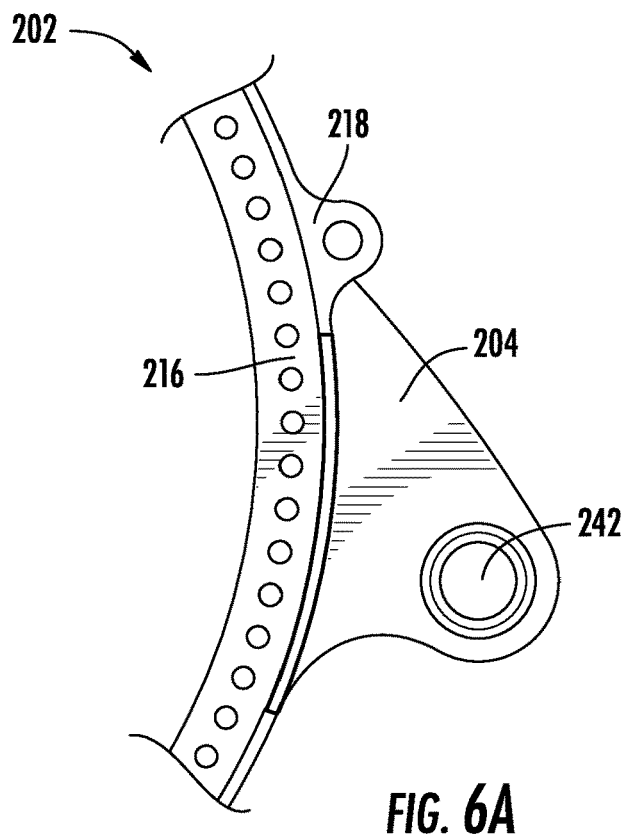
FIG. 6A illustrates a front view of one embodiment of a torque arm secured to a gearbox housing according to aspects of the present disclosure.
Figure 6B:
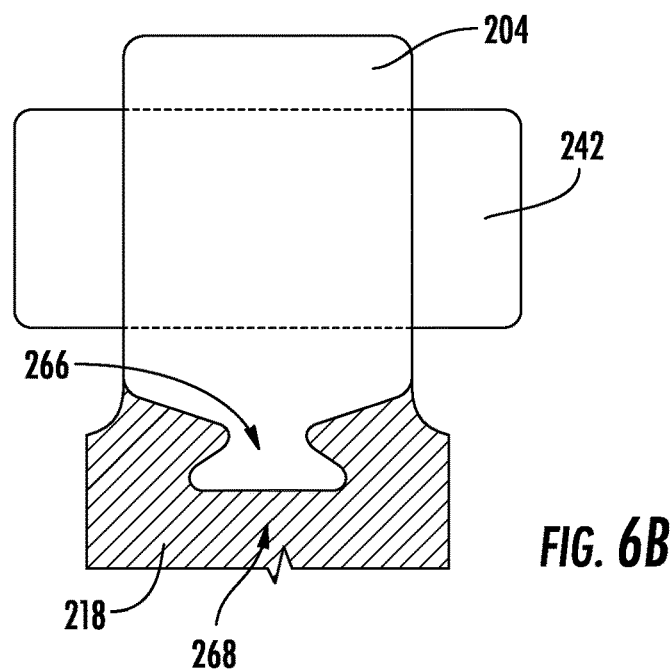
FIG. 6B illustrates a top view of the torque arm secured to the gearbox housing depicted in FIG. 6A.

Referring now to FIGS. 6A and 6B, a torque arm 204 may, as previously mentioned, be removably coupled to the exterior surface 218 of the gearbox housing 216. FIGS. 6A and 6B specifically depict the torque arm 204 being coupled to the exterior surface 218 via a dovetail joint. As such, the torque arm 204 may be formed with a dovetail 266 which is configured to be received by a corresponding dovetail mortise 268 and the exterior surface 218 so as to establish a secure interface between the torque arm 204 and the gearbox 202. It should be appreciated that while a single dovetail joint is illustrated, additional dovetails and corresponding dovetail mortises may be included in order to establish the removable coupling.

Figure 7A:
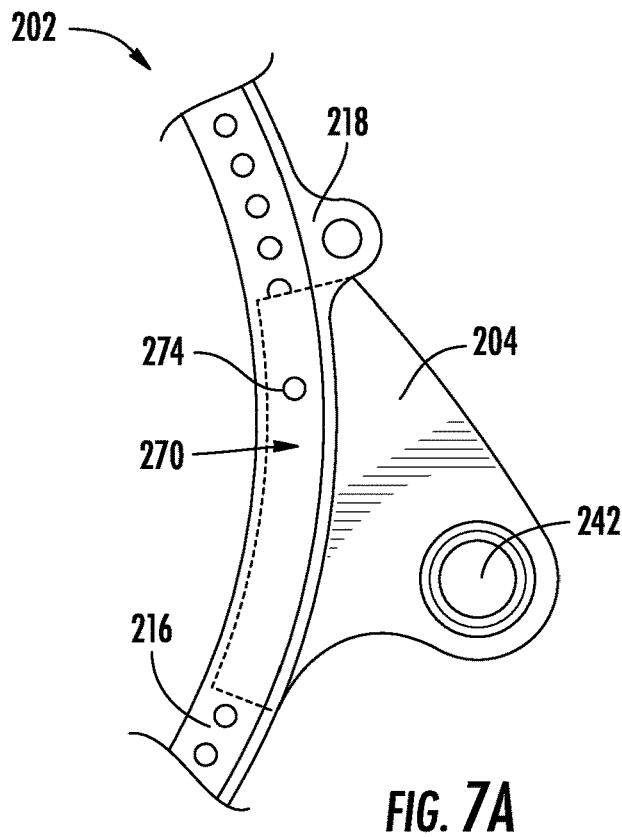
FIG. 7A illustrates a front view of one embodiment of a torque arm secured to a gearbox housing according to aspects of the present disclosure.
Figure 7B:
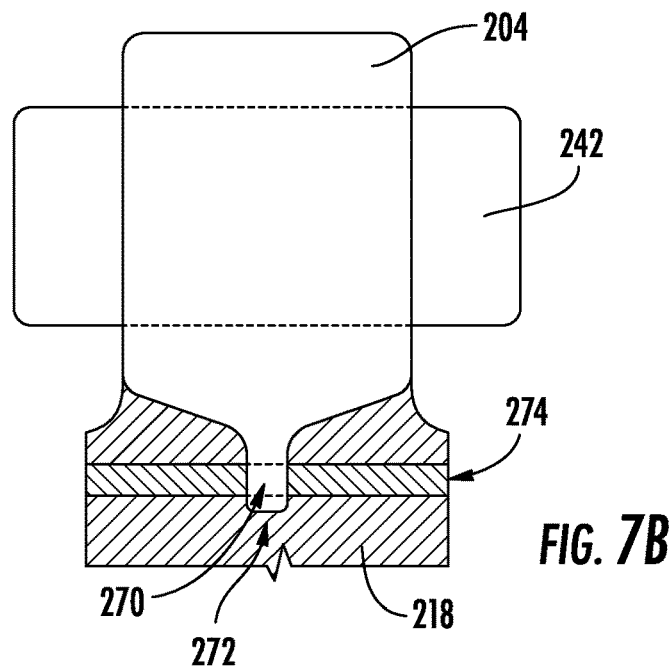
FIG. 7B illustrates a top view of the torque arm secured to the gearbox housing depicted in FIG. 7A.

FIGS. 7A and 7B depict an alternative embodiment for removably securing the torque arms 204 to the gearbox 202. In the depicted embodiment, the torque arm 204 is formed with a tenon 270 which is configured to be received by a corresponding mortise 272 formed in the exterior surface 218 of the gearbox housing 216. The tenon 270 may be mechanically secured within the mortise 272 through the inclusion of a securing pin 274, which is positioned therethrough. The tenon 270 may, in some embodiments, be at least one rounded protrusion, such as a pin, and the mortise 272 may be at least one corresponding hole. Just as in the dovetail joint discussed above, multiple mortise-and-tenon joints may be included in order to establish the removable coupling. However, it should be appreciated that, a single securing pin 274 may be employed to lock multiple mortise-and-tenon joints. It should be further appreciated that the securing pin 274 is not limited to a linear, smooth-sided pin, but may also include a threaded fastener, a curved element, or even a ring which may circumscribe the gearbox housing 216.

Figure 8:
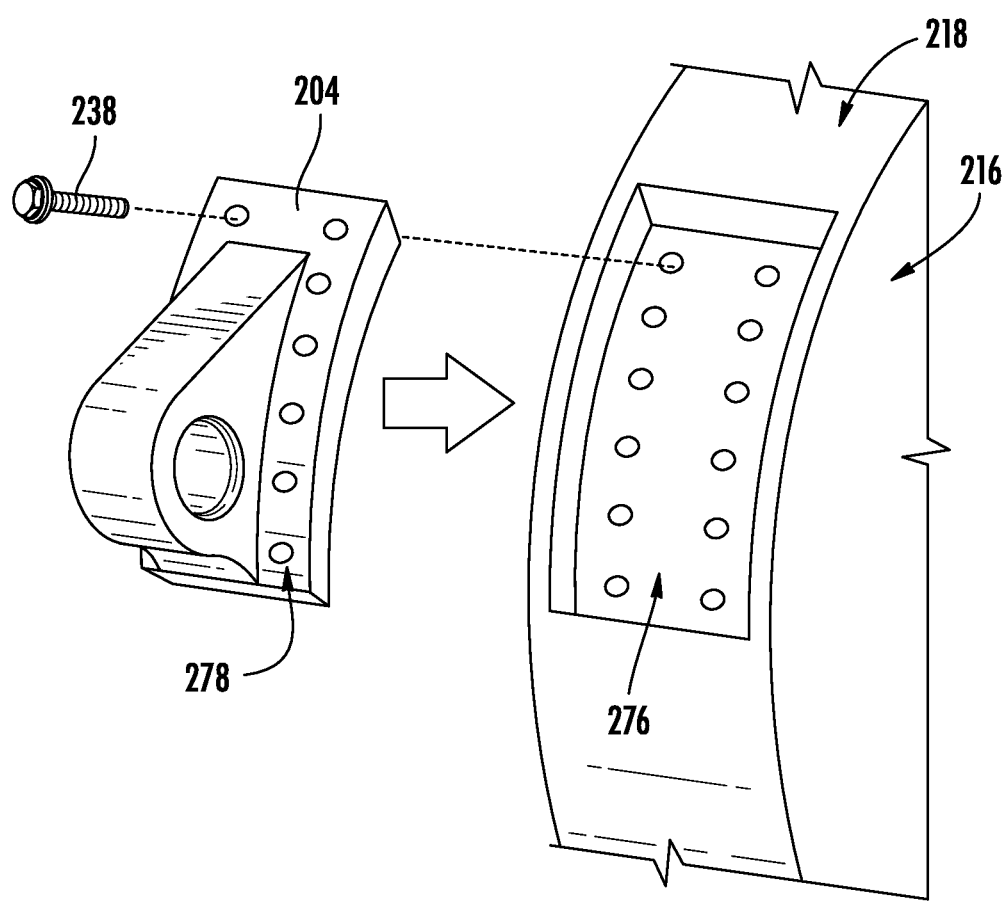
FIG. 8 illustrates a perspective view of one embodiment of a torque arm according to aspects of the present disclosure, particularly illustrating the torque arm having a flange for forming a bolted or bonded joint within a recess of the gearbox housing.

FIG. 8 depicts yet another alternative embodiment for removably securing the torque arms 204 to the gearbox 202. In the illustrated embodiment, the first and second torque arms 212, 214 or the exterior surface 218 of the gearbox housing 216 include a recess 276. The other of the first and second torque arms 212, 214 or the exterior surface 218 of the gearbox housing 216 may include a flange 278 configured to be received within the recess 276. The flange 278 may be employed in conjunction with a plurality of fasteners 238 to form a bolted joint between the gearbox 202 and the torque arm 204. Alternatively, a bonded joint may be formed during the installation of the gearbox 202 in the wind turbine 100 by welding or adhering the flange 278 within the recess 276.

Figure 9:
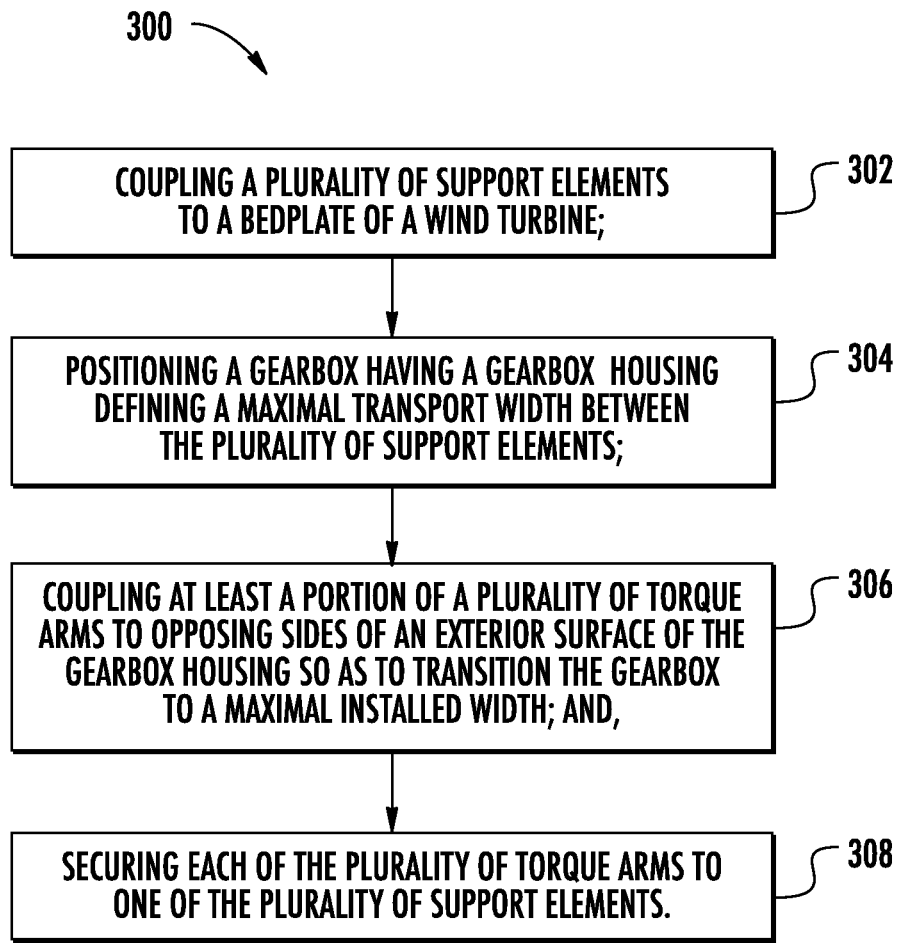
FIG. 9 illustrates a flow diagram of one embodiment of a method for assembling a gearbox assembly for a wind turbine according to aspects of the present disclosure.

Referring to FIG. 9, a flow diagram of one embodiment of a method 300 for assembling a gearbox assembly for a wind turbine is illustrated. The method 300 may be implemented using, for instance, the gearbox assembly 200 discussed above with reference to FIGS. 2-8. FIG. 9 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously or modified in various ways without deviating from the scope of the present disclosure.

As shown at (302), the method 300 includes coupling a plurality of support elements to a bedplate of a wind turbine. As shown at (304), the method 300 includes positioning a gearbox having a gearbox housing defining a maximal transport width between the plurality of support elements. As shown at (306), the method 300 includes coupling at least a portion of a plurality of torque arms to opposing sides of an exterior surface of the gearbox housing so as to transition the gearbox to a maximal width. As shown at (308), the method 300 includes securing each of the plurality of torque arms to one of the plurality of support elements.

In additional embodiments, coupling at least a portion of the plurality of torque arms to the gearbox housing may include coupling at least one detachable endcap positioned radially outward from a base portion to the base portion. Further, securing each of the plurality of torque arms to one of the plurality of support elements may include securing each of the plurality of torque arms to a pedestal bracket secured to the bedplate. In another embodiment, securing each of the plurality of torque arms to one of the plurality of support elements may include securing the mounting pin between a pair of detachable end caps positioned radially outward from the base portion of a torque arm of the plurality of torque arms.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gearbox assembly for a wind turbine, the gearbox assembly comprising:
   a gearbox having an installed width and a transport width, the installed width being greater than the transport width, the gearbox comprising:
      a gearbox housing comprising an exterior surface and an inner cavity, the exterior surface defining the transport width; and,
      a gearing arrangement arranged within the inner cavity;
   a first torque arm removably coupled to a first side of the gearbox housing via first attachment means;
   a second torque arm removably coupled to an opposing, second side of the gearbox housing via a separate, second attachment means, each of the first and second torque arms comprising a proximal end and a distal end, the proximal ends coupled to the exterior surface of the gearbox housing such that a distance between the distal ends of the first and second torque arms define the installed width when the wind turbine is operating; and
   at least one support element coupling the first and second torque arms to a bedplate of the wind turbine.

2. The gearbox assembly of claim 1, wherein the installed width is a maximal installed width and the transport width is a maximal transport width.

3. The gearbox assembly of claim 1, wherein the first and second torque arms each comprise a base portion comprising the proximal ends thereof and at least one detachable endcap positioned radially outward from the base portion.

4. The gearbox assembly of claim 3, wherein the at least one support element comprises a pedestal bracket secured to the bedplate and supporting a mounting pin.

5. The gearbox assembly of claim 4, wherein the pedestal bracket further comprises opposing bracket arms defining a gap therebetween that receives the at least one endcap, the mounting pin secured between the at least one endcap and the base portion of one of the first and second torque arms.

6. The gearbox assembly of claim 5, further comprising:
   a segmented bushing arranged between the opposing bracket arms that receive the mounting pin.

7. The gearbox assembly of claim 4, wherein the first and second torque arms each comprise a pair of detachable endcaps positioned radially outward therefrom.

8. The gearbox assembly of claim 7, wherein the pedestal bracket is disposed between the pair of detachable endcaps, the mounting pin secured through the pedestal bracket, the mounting pin secured between the pair of detachable endcaps and the base portion of one of the first and second torque arm.

9. The gearbox assembly of claim 1, wherein the proximal end of at least one of the first and second torque arms arm is removably coupled to the exterior surface of the gearbox housing via at least one of the first and second attachment means, wherein the first and second attachment means comprises at least one of a dovetail joint, a mortise-and-tenon joint, a bolted joint, or a bonded joint.

10. The gearbox assembly of claim 9, wherein the mortise-and-tenon joint further comprises an additional securing pin positioned therethrough.

11. The gearbox assembly of claim 9, wherein the first and second torque arms or the exterior surface of the gearbox housing comprises a recess and the other of the first and second torque arms or the exterior surface of the gearbox housing comprises a flange received within the recess, the flange forming the bolted joint or the bonded joint.

12. The gearbox assembly of claim 2, wherein the maximal transport width is less than or equal to 2.34 meters.

13. A method for assembling a gearbox assembly for the a wind turbine, the method comprising:
   coupling a plurality of support elements to a bedplate of the wind turbine;
   positioning a gearbox having a gearbox housing defining a maximal transport width between the plurality of support elements and a plurality of torque arms so as to transition the gearbox housing to a maximal installed width, wherein the maximal installed width is greater than the maximal transport width, the maximal installed width being defined between a distal end of each of the plurality of torque arms when the wind turbine is operating;
   coupling at least a portion of each of the plurality of torque arms to opposing sides of an exterior surface of the gearbox housing via first and second attachment means on the opposing sides of the exterior surface of the gearbox housing, the first and second attachment means being distinct and separate from each other; and
   securing each of the plurality of torque arms to one of the plurality of support elements.

14. The method of claim 13, wherein the maximal transport width is less than or equal to 2.34 meters and wherein the coupling at least a portion of the plurality of torque arms to the gearbox housing further comprises coupling at least one detachable endcap positioned radially outward from a base portion to the base portion.

15. The method of claim 14, wherein the securing each of the plurality of torque arms to one of the plurality of support elements comprises securing each of the plurality of torque arms to a pedestal bracket secured to the bedplate, wherein the pedestal bracket supports a mounting pin.

16. The method of claim 15, wherein the pedestal bracket further comprises opposing bracket arms defining a gap therebetween that receives the at least one endcap, the mounting pin secured between the at least one endcap and the base portion of at least one of the plurality of torque arms.

17. The method of claim 15, wherein the securing each of the plurality of torque arms to one of the plurality of support elements comprises securing the mounting pin between a pair of detachable end caps positioned radially outward from the base portion of a torque arm of the plurality of torque arms, wherein the pedestal bracket is disposed between the pair of detachable endcaps.

18. The method of claim 13, wherein the coupling at least a portion of a plurality of torque arms to opposing sides of an exterior surface of the gearbox further comprises coupling a proximal end of at least one of the plurality of torque arms to the exterior surface of the gearbox housing via at least one of a dovetail joint, a mortise-and-tenon joint, a bolted joint, or a bonded joint.

19. The method of claim 18, wherein the proximal end of at least one of the plurality of torque arms or the exterior surface of the gearbox comprises a recess, and the other of the proximal end or the exterior surface comprises a flange received within the recess, the flange forming the bolted joint or the bonded joint.

20. A wind turbine, comprising:
a tower;
a nacelle mounted atop the tower;
a rotor;
a gearbox positioned within the nacelle and comprising a maximal installed width and a maximal transport width, the maximal installed width being greater than the maximal transport width, the gearbox further comprising:
   a gearbox housing comprising a first side and an opposing, second side and an inner surface and an outer surface, the inner surface defining an inner cavity, and
   a gearing arrangement having a portion contained within the inner cavity;
a plurality of torque arms removably coupled to the gearbox housing via first and second attachment means, the first and second attachment means being distinct and separate from each other, each torque arm of the plurality of torque arms comprising a proximal end and a distal end opposite thereof, a distance between respective distal ends of two torque arms of the plurality of torque arms defining the maximal installed width when the wind turbine is operating;
at least one support element coupled to the plurality of torque arms and a bedplate support frame; and
a rotor shaft rotatably coupling the rotor to the gearbox.

\* \* \* \* \*